(12) United States Patent
Kaper et al.

(10) Patent No.: US 9,270,002 B2
(45) Date of Patent: Feb. 23, 2016

(54) DIFFERENTIAL-TO-SINGLE-ENDED TRANSMISSION LINE INTERFACE

(71) Applicant: Raytheon Company, Waltham, MA (US)

(72) Inventors: Valery S. Kaper, Winchester, MA (US); Anthony Kopa, Somerville, MA (US)

(73) Assignee: Raytheon Company, Waltham, MA (US)

( * ) Notice: Subject to any disclaimer, the term of this patent is extended or adjusted under 35 U.S.C. 154(b) by 131 days.

(21) Appl. No.: 13/947,328

(22) Filed: Jul. 22, 2013

(65) Prior Publication Data

US 2015/0022279 A1 Jan. 22, 2015

(51) Int. Cl.
| | | |
|---|---|---|
| *H03H 7/38* | (2006.01) | |
| *H01P 3/02* | (2006.01) | |
| *G06F 13/40* | (2006.01) | |
| *H03H 7/42* | (2006.01) | |
| *H01P 5/02* | (2006.01) | |

(52) U.S. Cl.
CPC ............ *H01P 3/026* (2013.01); *G06F 13/4068* (2013.01); *H01P 5/028* (2013.01)

(58) Field of Classification Search
CPC .................................. H01P 5/00; H01P 5/184
USPC ............. 333/1, 4, 5, 109, 112, 115, 116, 124, 333/125, 19, 24 R, 25, 26
See application file for complete search history.

(56) References Cited

U.S. PATENT DOCUMENTS

| | | | |
|---|---|---|---|
| 4,626,889 A * | 12/1986 | Yamamoto et al. | 326/101 |
| 4,785,202 A * | 11/1988 | Toyoda | 326/101 |
| 4,864,291 A | 9/1989 | Korpi | |
| 4,945,317 A * | 7/1990 | Sato et al. | 330/301 |
| 5,214,318 A * | 5/1993 | Nakanishi et al. | 326/124 |
| 5,220,286 A | 6/1993 | Nadeem | |
| 6,239,668 B1 * | 5/2001 | Menna et al. | 333/25 |
| 6,492,881 B2 | 12/2002 | Wright et al. | |
| 7,034,633 B2 * | 4/2006 | Passiopoulos et al. | 333/116 |
| 7,049,901 B2 * | 5/2006 | Sacco | 333/4 |
| 8,222,918 B1 | 7/2012 | Tan | |
| 2007/0139080 A1 | 6/2007 | Tang | |
| 2009/0295481 A1 | 12/2009 | Lin et al. | |
| 2010/0259337 A1 | 10/2010 | Tabatabai | |

FOREIGN PATENT DOCUMENTS

| | | |
|---|---|---|
| EP | 0 482 336 A1 | 4/1992 |
| EP | 0 939 375 A2 | 9/1999 |
| WO | WO 2009/029721 A1 | 3/2009 |

OTHER PUBLICATIONS

TDA Systems, Characterization of Differential Interconnects from TDR Measurements, 1999-2000, pp. 1-6.
Notification of Transmittal of The International Search Report and The Written Opinion of the International Searching Authority, or the Declaration, PCT/US2014/040608, Aug. 25, 2014, 1 page.
International Search Report, PCT/US2014/040608, Aug. 25, 2014, 4 pages.
Written Opinion of the International Searching Authority, PCT/US2014/040608, Aug. 25, 2014, 4 pages.
Taiwan Office Action including Search Report and English Translation, Application No. 103120169, Sep. 18, 2015, 15 pages.

\* cited by examiner

*Primary Examiner* — Dean Takaoka
(74) *Attorney, Agent, or Firm* — Daly, Crowley, Mofford & Durkee, LLP (57) ABSTRACT

An interface for connecting a differential signal circuit having a differential signal output and a reference potential terminal to an input of a single ended signal circuit and a reference potential terminal. The interface includes a differential transmission line having a pair of electromagnetically coupled microwave transmission lines having first ends connected to the differential signal output and second ends, one of the second ends being connected to the single ended circuit input and the other one of the second ends being coupled to the reference potential terminals of the differential signal circuit and the single ended signal circuit.

8 Claims, 8 Drawing Sheets

DIFFERENTIAL-TO-SINGLE-ENDED TRANSMISSION LINE INTERFACE

STATEMENT REGARDING FEDERALLY SPONSORED RESEARCH OR DEVELOPMENT

This invention was made with Government support under Contract No. FA8650-11-C-7157 awarded by the Department of the Air Force. The Government has certain rights in this invention.

TECHNICAL FIELD

This disclosure relates generally to differential-to-single ended transmission lines interfaces.

BACKGROUND

As is known in the art, single-ended data transmission uses only one signal line, with its voltage potential referred to ground. While the signal line provides the forward path for signal currents, ground provides the return current path. Single-ended interfaces benefit from their simplicity and their low implementation cost, but have three main drawbacks:

1) They are highly sensitive to noise pick-up, because noise induced into the signal or ground paths adds directly to the receiver input, thus causing false receiver triggering.

2) Another concern is crosstalk, which is the capacitive and inductive coupling between adjacent signal and control lines, particularly at higher frequencies. Further, due to the physical differences between the signal trace and the ground plane, the transversal electromagnetic waves (TEM) generated in single-ended systems can radiate into the circuit environment, thus representing a significant source of electromagnetic interference (EMI) to adjacent circuits.

As is known in the art, differential signaling uses a signal pair consisting of two conductors—one for the forward, the other for the return current to flow. Each signal conductor possesses a common-mode voltage, VCM, superimposed with SO percent of the differential-driver output VOD, but of opposite polarity to one another. When the conductors of a differential pair are close to each other, electrically coupled external noise induced into both conductors equally appears as common-mode noise at the receiver input. Receivers with differential inputs are sensitive to signal differences only, but immune to common-mode signals. The receiver, therefore, rejects common-mode noise and signal integrity is maintained. Close electric coupling provides another benefit. The currents in the two conductors, being of equal amplitude but opposite polarity, create magnetic fields that cancel each other. The TEM waves of the two conductors, now being robbed of their magnetic fields, cannot radiate into the environment. Only the far smaller fringing fields outside the conductor loop can radiate, thus yielding significantly lower EMI.

As is also known in the art, it is sometimes necessary to connect differential signal circuit (such as a driver fabricated using, for example, a silicon-based technology) to single-ended circuit (a receiver such fabricated using III-V-based technology). Proper interface between the differential signal circuit and the single-ended circuit is critical to system performance, even more so in multi-chip modules with large distances between the chips.

Figure 1:
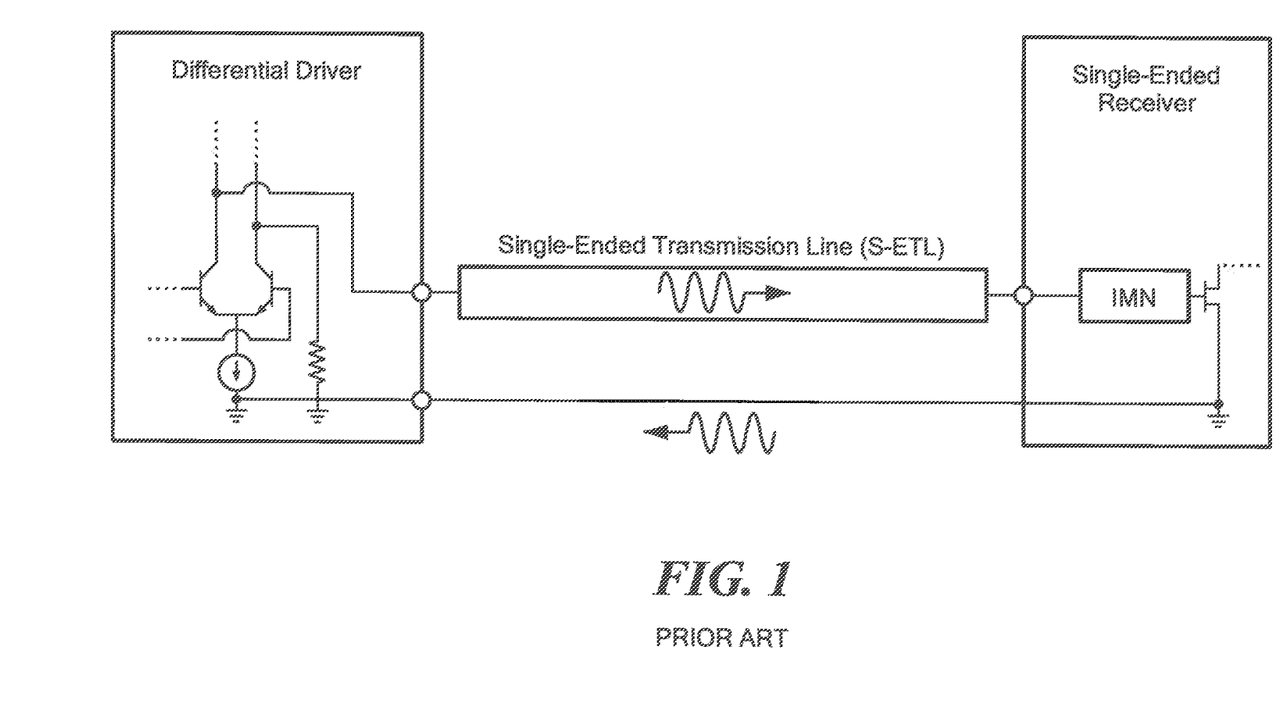
FIG. 1 is a schematic circuit diagram of a differential signal circuit having a differential signal output connected to an input of a single ended signal circuit according to the PRIOR ART.
Figure 2:
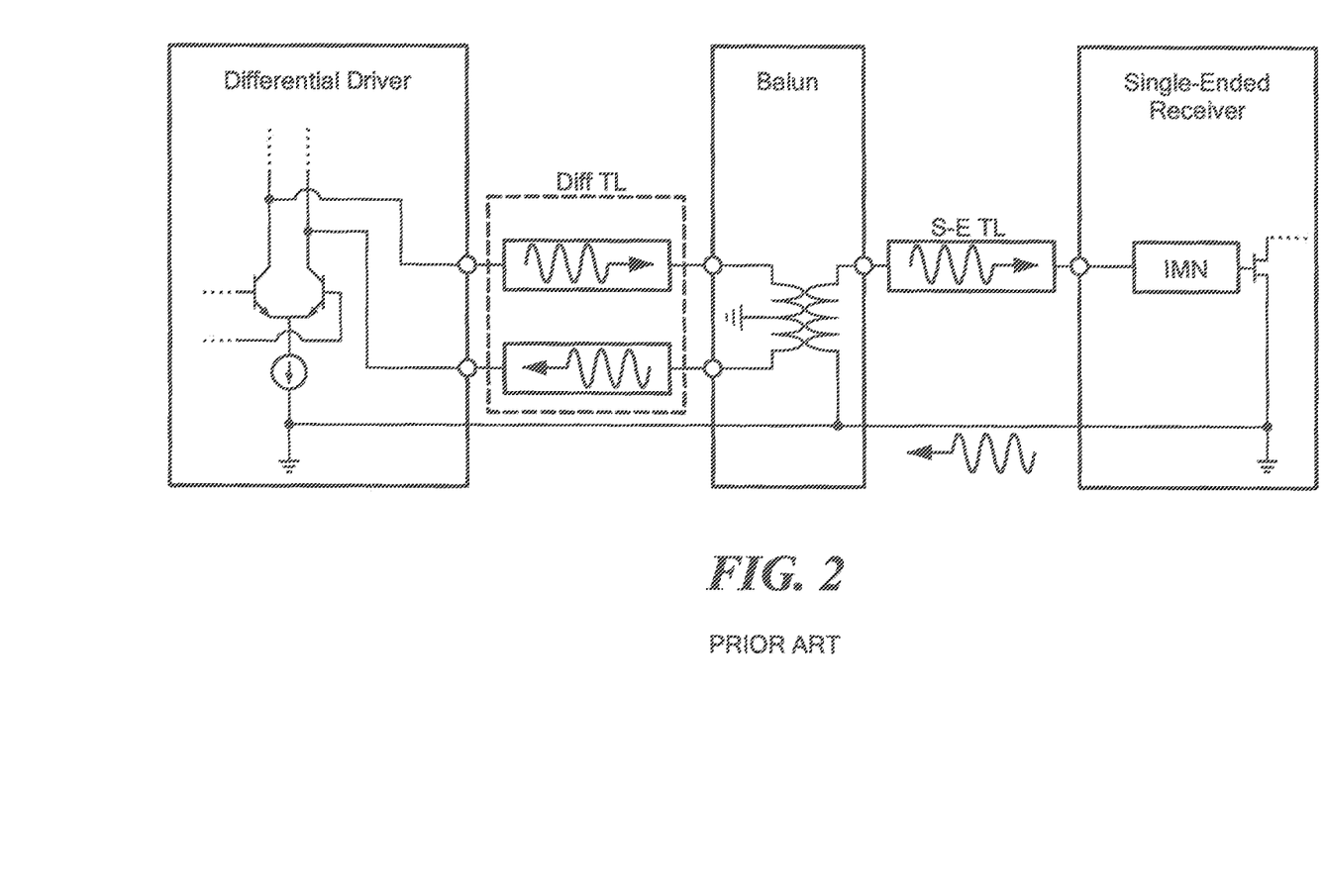
FIG. 2 is a schematic circuit diagram of a differential signal circuit having a differential signal output connected to an input of a single ended signal circuit according to the PRIOR ART.

One technique used to connect differential circuitry, such as a driver, to single ended circuitry, such as a receiver, is shown on FIG. 1. Here, a differential driver includes a pair of bipolar transistors formed on a silicon chip having collector electrodes providing a differential signal and emitter electrodes connected together and then to a reference potential, here ground, through a current source, as shown. One of the collector outputs is connected to one end of a single ended transmission line (TL) and the other collector is connected to the reference potential through a resistor, as shown. The other end of the single ended transmission line is connected to the input of a receiver. The receiver includes a Field Effect Transistor FET formed on a column III-V semiconductor chip. The FET has a gate electrode connected to the single ended transmission line through an input impedance matching network (IMN), as shown, an a source electrode connected to the reference potential, as shown. The disadvantages are: Cross-talk between adjacent TLs; Driver sensitivity to noise in bias lines ("ground bounce"); Additional TL loss due to radiation; and one-half of the signal is lost in the termination within the driver Another interface uses a balun (passive balanced-to-unbalanced transformer) as shown in FIG. 2. Depending on where the balun is located (it could be on either of the two chips or as a separate component), the driver and receiver are connected through either a single-ended transmission line (TL) or a differential TL (Diff TL) or combination of the two. Disadvantages in using a balm are: There is some cross-talk between adjacent TL and radiation loss if single ended transmission line (S-E TL) is used; Balm loss and bandwidth limit; and Balun complexity and size (especially at low frequencies.

Figure 3:
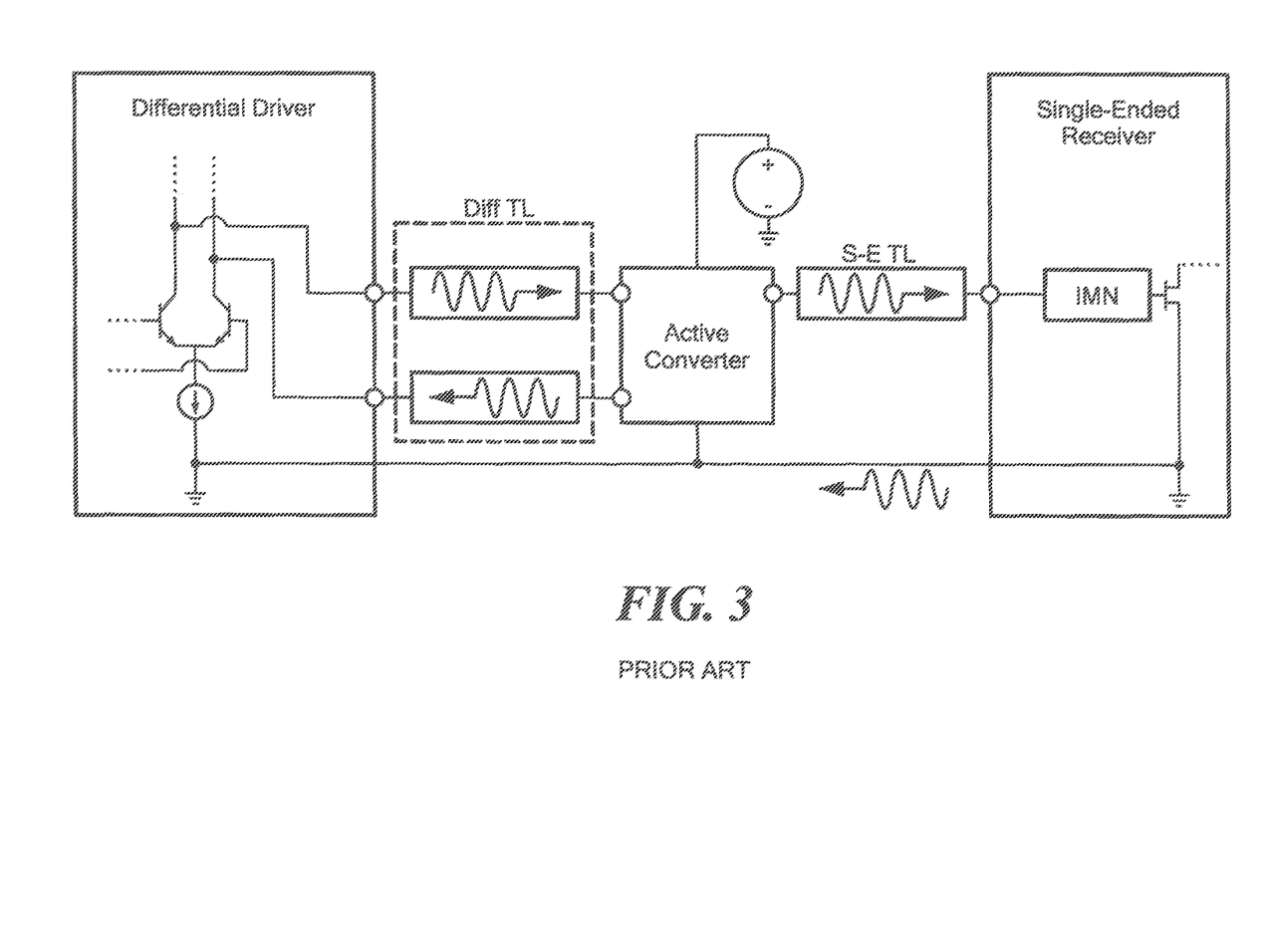
FIG. 3 is a schematic circuit diagram of a differential signal circuit having a differential signal output connected to an input of a single ended signal circuit according to the PRIOR ART.

Yet, another interface uses an active converter, as shown in FIG. 3. Depending where the active converter is located (it could be on either of the two chips or as a separate component), the driver and receiver are connected through either a single-ended TL or a differential TL or combination of the two. Disadvantages: Some cross-talk between adjacent TL and radiation loss if single ended TL is used; The active converter's bandwidth limit and its DC power consumption of the DC voltage source.

SUMMARY

In accordance with the present disclosure, an interface is provided for connecting a differential signal circuit having a differential signal output and a reference potential terminal to an input of a single ended signal circuit and a reference potential terminal. The interface includes a differential transmission line comprising a pair of electromagnetically coupled microwave transmission lines having first ends connected to the differential signal output and second ends, one of the second ends being connected to the single ended circuit input and the other one of the second ends being coupled to the reference potential terminals.

In one embodiment, the differential transmission line comprises a pair of electromagnetically coupled microstrip transmission lines having a pair of strip conductors disposed over a common ground plane conductor.

In one embodiment, the differential transmission line comprises stripline structures having a pair of electromagnetically coupled strip conductors disposed between a pair of common ground plane conductors to form a pair of stripline transmission lines.

In one embodiment, the differential transmission line has a predetermined odd mode characteristic impedance and wherein said other one of the second ends is connected to the reference potential terminals through an impedance matching circuit having an impedance matched to the predetermined odd mode characteristic impedance of the differential transmission line.

In one embodiment, an interface structure is provided for connecting a plurality differential signal circuits, each one having a differential signal output and a reference potential terminal, to a plurality of single ended signal circuits, each one having an input and a reference potential terminal. The interface structure includes: a plurality of stacked differential transmission lines, each one of the differential transmission lines having a pair of electromagnetically coupled microwave stripline structures, each one of the strip line structures having a pair of strip conductors disposed in a plane between a pair of ground plane conductors to form a pair of stripline circuits for each one of the plurality of stacked stripline structures. The pair of strip conductors of each one of the stripline structures have first ends connected to the differential signal output of a corresponding one of the plurality of differential signal circuits and one of the second ends connected to the input of a corresponding one of the plurality of single ended circuits and the other one of the second ends coupled to the reference potential terminals of the plurality of differential signal circuits and the plurality of single ended signal circuits.

In one embodiment, portions of the pair of strip conductors of one of the stripline structures overlay portions of the pair of strip conductors of another one of the stripline structures.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 4:
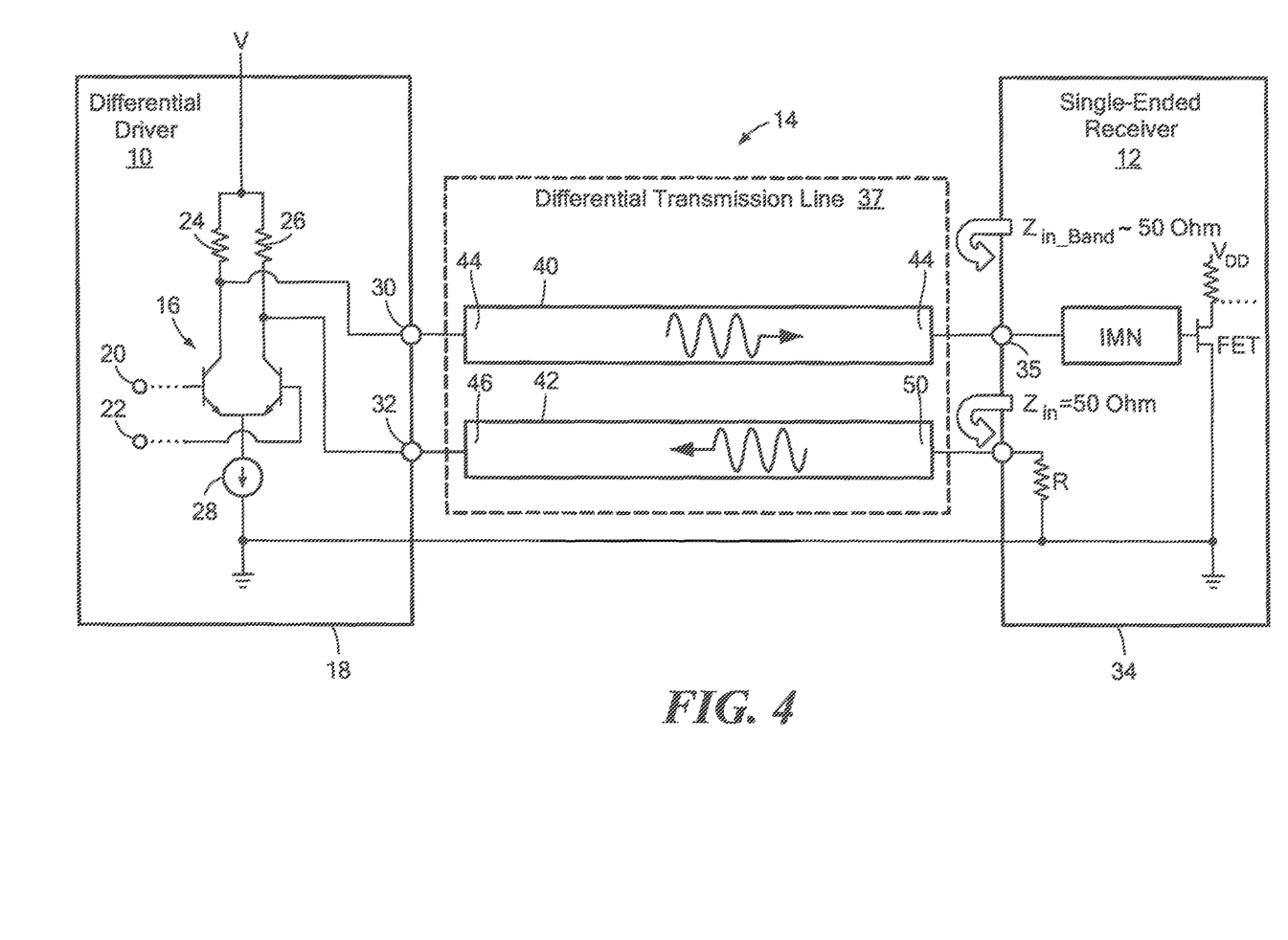
FIG. 4 is a schematic circuit diagram of a differential signal circuit having a differential signal output connected to an input of a single ended signal circuit according to the disclosure.

Referring now to FIG. 4, a differential signal circuit transmitter 10 is shown connected to a single ended signal circuit receiver 12 through an interface 14. More particular, the transmitter 10 includes a differential driver 16, here a differential amplifier having a pair of bipolar transistors T1, T2 formed on a silicon substrate 18. The transistors T1, T2 have an input signal fed to the base electrodes thereof via input terminals 20, 22. The collectors are connected to a voltage source V through resistors 24, 26, as shown. The emitter electrodes are connected together and then to a reference potential, here ground, through a current source 28, as shown. It is noted that each one of the collectors is connected to a corresponding one of a pair of output terminals 30, 32, as shown and thereby produce a differential signal output between the output terminals 30, 32.

The receiver 12 includes a field effect transistor FET having a gate electrode connected to the interface 14 through an impedance matching network (IMN), as shown. Here the FET and is formed on a column III-V substrate 34, as shown. The drain electrode is coupled to a voltage source VDD and the source electrode is connected to a reference potential, here ground as shown. The receiver 12 is a single ended signal circuit having a single input 35.

The interface 14 includes a differential transmission line 37 having a pair of electromagnetically coupled strip conductors 40, 42 having first ends 44, 46 connected to the differential signal output (output terminal 30, 32) and second ends 48, 50, one of the second ends 48 being connected to the single ended circuit input 35 and the other one of the second ends 50 being connected to the reference potential terminals of the differential signal circuit and the single ended signal circuit, here ground; it being noted that the second end 50 is coupled to ground though a resistor R also formed on the column III-V substrate 34, as shown.

Figure 5:
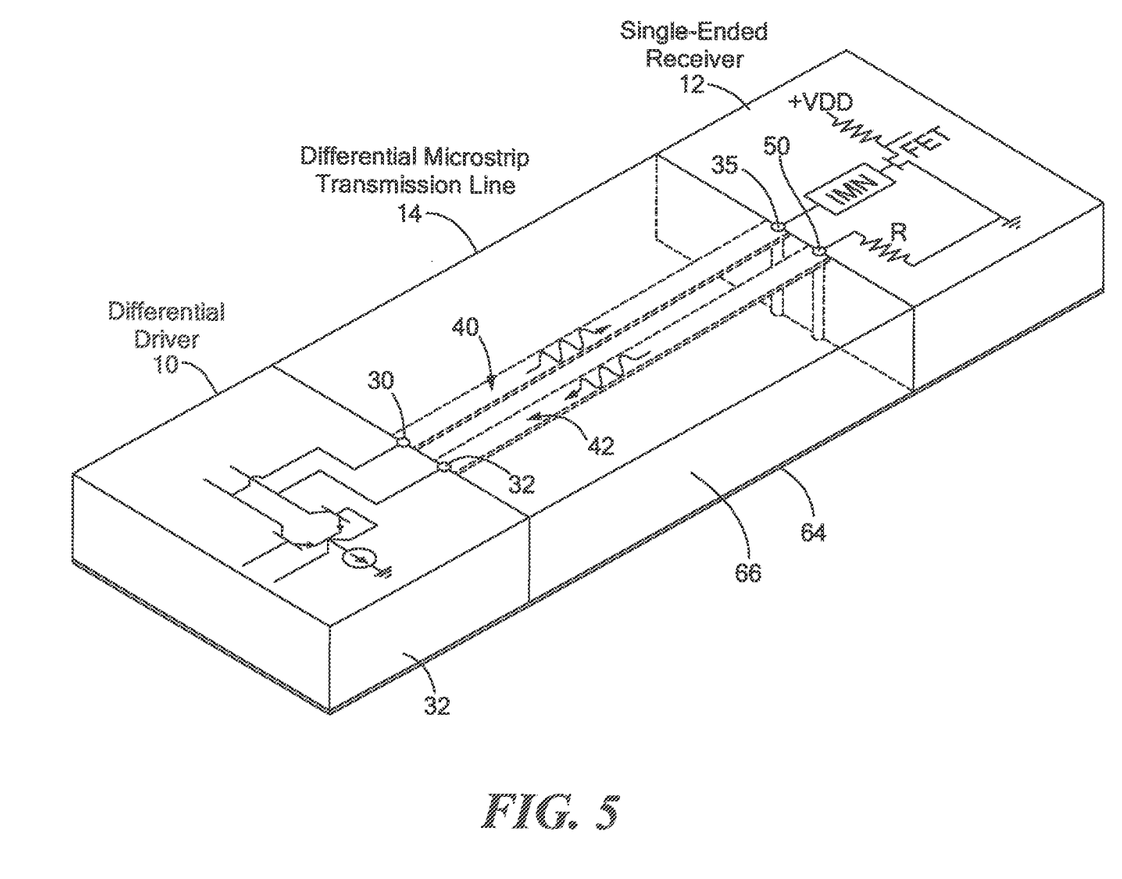
FIG. 5 is a diagrammatical sketch of the schematic circuit diagram of FIG. 4.

More particularly, referring also to FIG. 5, the pair of strip conductors 40, 42 is disposed over a common ground plane conductor 64. Still more particularly, the strip conductors 40, 42 are disposed on one surface of a dielectric substrate 66 and the ground plane conductor 64 is deposed on the opposite surface of the dielectric substrate 66.

It is noted that the differential transmission line 37 has a predetermined odd mode characteristic impedance. The odd mode characteristic impedance is the characteristic impedance of a single transmission line when the two strip conductors 40, 42 in the differential transmission line are driven differentially (with signals of the same amplitude and opposite polarity). Thus, referring also to FIG. 5A, the differential transmission line 37 is made up of two microstrip transmission lines, 60, 62. One of the two microstrip transmission lines includes strip conductor 40 and the portion of the ground plane conduction under the strip conductor 40. Thus, there is an electric field between the strip conductor 40 and the portion of the ground plane conduction under the strip conductor 40 as indicated by the arrows in FIG. 5A. The other one of the two microstrip transmission lines includes strip conductor 42 and the portion of the ground plane conduction under the strip conductor 42. Thus, there is an electric field between the strip conductor 40 and the portion of the ground plane conduction under the strip conductor 40 as indicated by the arrows in FIG. 5A. It is noted that the two strip conductors 40, 40 are proximate each other such that an electric field exists between the two strip conductors 40, 42 as indicated by the arrows in FIG. 5A. Thus, the differential transmission line 37 comprises a pair of electromagnetically coupled microwave transmission lines 60, 62.

Figure 5A:
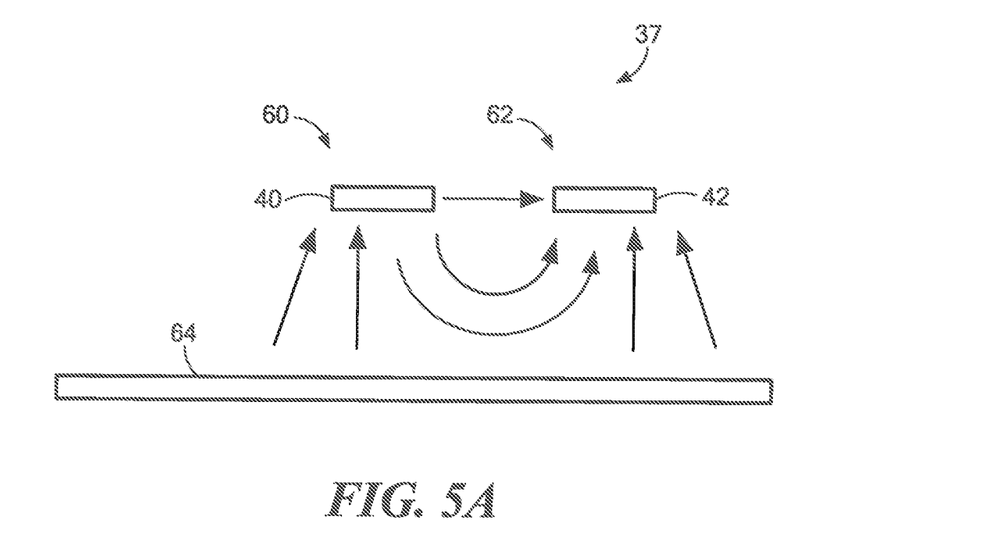
FIG. 5A is a diagrammatic sketch of a differential transmission line used in the circuit of FIG. 5.

The impedance between the input terminal 30 and the input terminal 32, that is, the odd mode characteristic impedance of the differential transmission line 37, is here, for example, 50 ohms. Thus, the IMN is designed to provide an input impedance into the input terminal 35 matched to the predetermined odd mode characteristic impedance of the differential transmission line 37, here, for example, 50 ohms. Likewise, the resistor R is designed to provide an input impedance matched to the predetermined odd mode characteristic impedance of the differential transmission line 37, here, for example, 50 ohms.

Figure 6:
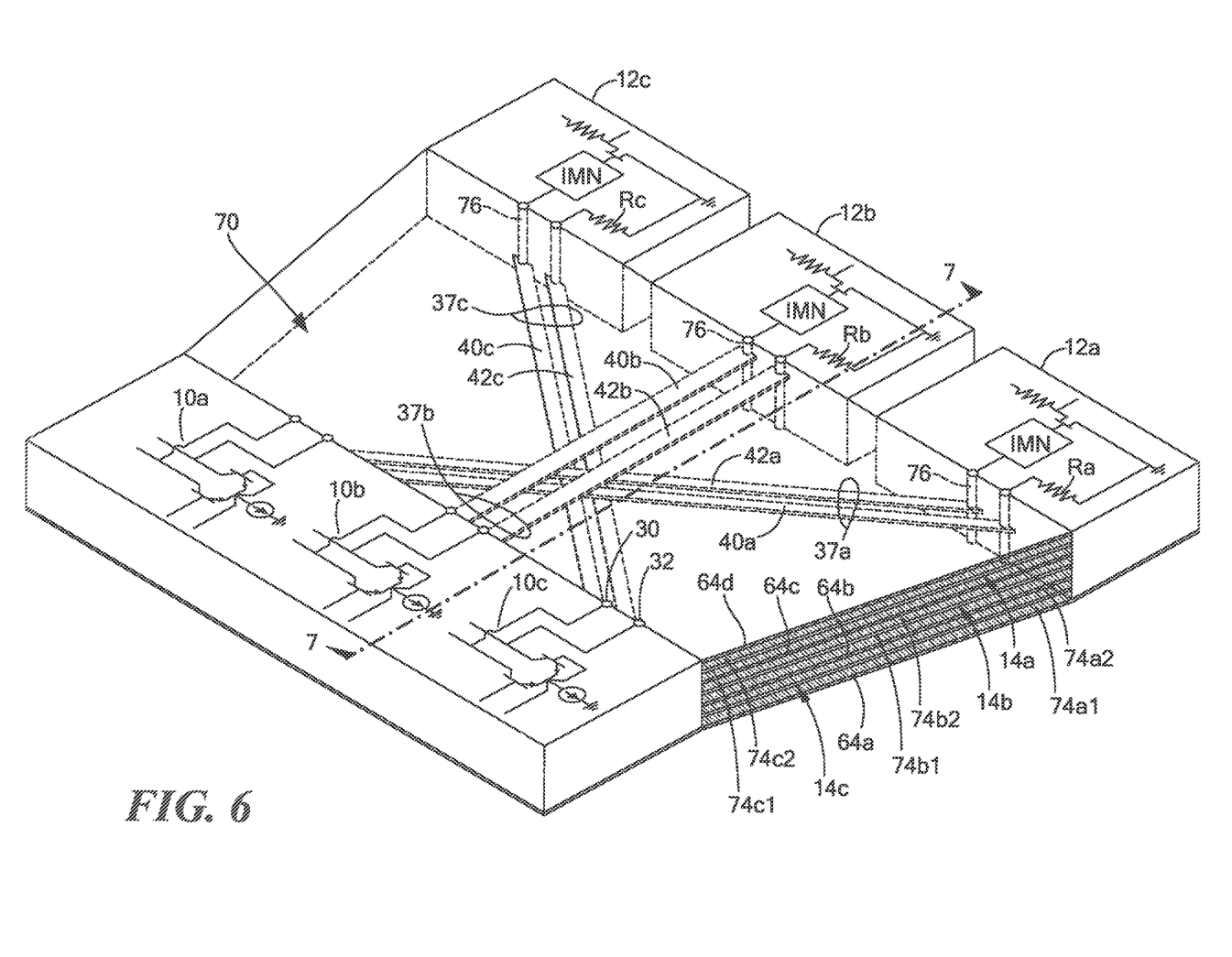
FIG. 6 is a diagrammatical sketch of a schematic circuit diagram showing a plurality of differential signal circuits interconnected to a plurality single ended signal circuits according to the disclosure.

Referring now to FIG. 6 an interface structure 70 is shown for connecting a plurality of, here for illustration three, differential signal circuit transmitters differential signal circuits, 10a-10c, each one having a differential signal output and a reference potential terminal, to a corresponding plurality of single ended signal circuits 12a-12c, each one having an input and a reference potential terminal.

The interface structure 70 includes: a plurality of, here three, stacked differential transmission lines, 37a, 37b and 37c (FIG. 7), each comprising a pair of electromagnetically coupled microwave transmission lines, here stripline structures 14a-14c, each one of the stripline structures 14a-14c having a pair of strip conductors 40a, 42a-40c, 42c, respectively, as shown, disposed in a plane between a pair of ground plane conductors 64a-64d to form a pair of stripline circuits for each one of the plurality of stacked stripline structures 14a-14c. The pair of strip conductors 40a, 42a of stripline structures 14a have first ends connected to the transmitters differential signal circuits 10a and one of the second ends connected to the input of single ended signal circuit 12a and the other one of the second ends connected to the reference potential terminals of the plurality of differential signal circuits and the plurality of single ended signal circuits through a matching resistor Ra, as indicated. The pair of strip conductors 40b, 42b stripline structures 14b have first ends connected to the transmitters differential signal circuits 10b and one of the second ends connected to the input of single ended signal circuit 12b and the other one of the second ends connected to the reference potential terminals of the plurality of differential signal circuits and the plurality of single ended signal circuits through a matching resistor Rb, as indicated. In like manner, The pair is of strip conductors 40c, 42c of stripline structures 14c have first ends connected to the transmitters differential signal circuits 10c and one of the second ends connected to the input of single ended signal circuit 12a and the other one of the second ends connected to the reference potential terminals of the plurality of differential signal circuits and the plurality of single ended signal circuits through a matching resistor Rc, as indicated. It is noted that portions of the pair of strip conductors of one of the stripline structures overlay portions of the pair of strip conductors of another one of the stripline structures.

Figure 7:
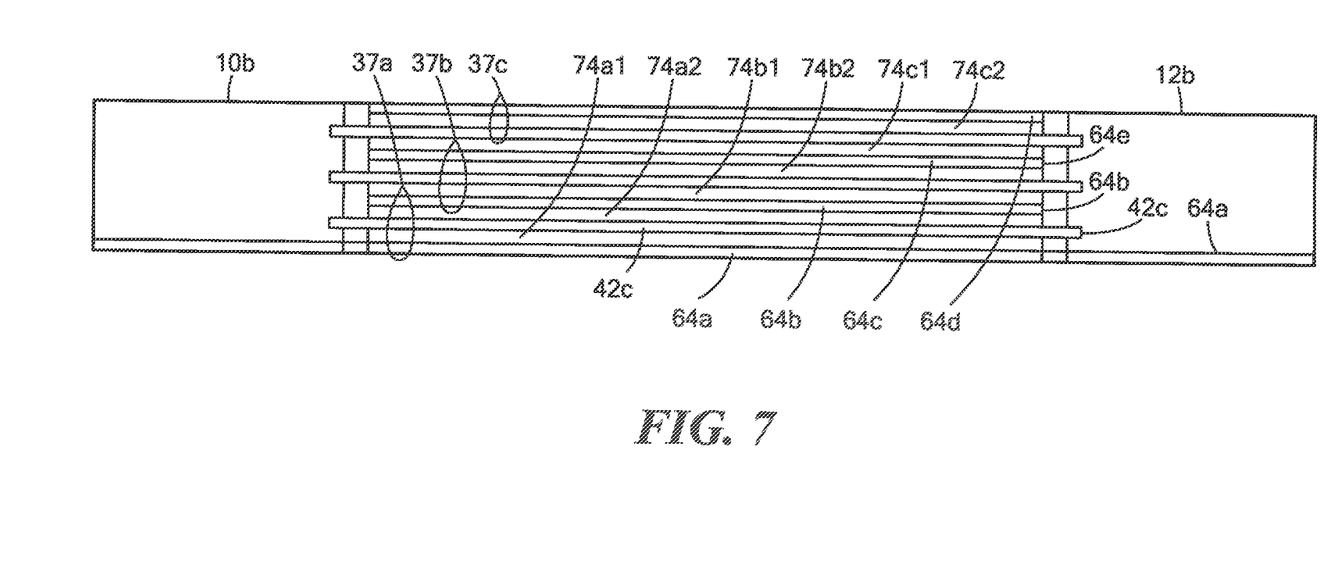
FIG. 7 is a cross sectional sketch of a portion of the diagrammatical sketch of FIG. 6 taken along line 7-7 in FIG. 6 according to another embodiment of the disclosure.

More particularly, and referring also to FIG. 7, the stripline structures 14a-14c each includes a pair of dielectric boards $74a_1$, $74a_2$-$74c_1$, $74c_2$, as shown. Dielectric board $74a_1$ has a ground plane conductor 64a on its bottom surface and dielectric board $74a_2$ has a ground plane conductor 64b on its upper surface. Disposed between the upper surface of the dielectric board $74a_1$ and the lower surface of the dielectric board $74a_2$ are the pair of strip conductors 40c and 42c. Dielectric board $74b_1$ has the ground plane conductor 64b on its lower surface and dielectric board $74b_2$ has a ground plane conductor 64c on its upper surface. Disposed between the upper surface of the dielectric board $74b_1$ and the lower surface of the dielectric board $74b_2$ are the pair of strip conductors 40b and 42b.

In like manner, dielectric board $74c_1$ has a ground plane conductor 64c on its bottom surface and dielectric board $74c_2$ has a ground plane conductor 64d on its upper surface. Disposed between the upper surface of the dielectric board $74c_1$ and the lower surface of the dielectric board $74c_2$ are the pair of strip conductors 40a and 42a.

Thus, the ground plane conductors 64b and 64c provide electrical isolation between the, stacked differential transmission lines, 37a, 37b and 37c.

Here again, referring to FIGS. 6 and 7, each one of the stacked differential transmission lines 37a, 37b and 37c has a predetermined odd mode characteristic impedance and wherein said other one of the second ends is connected to the reference potential terminals through an impedance matching circuit having an impedance matched to the predetermined odd-mode characteristic impedance of such one of the stacked differential transmission lines 37a, 37b and 37c. The impedance matching circuit includes a resistor Ra, Rb and Rc. Here, for example, the odd mode impedance of each one of the differential transmission lines is 50 ohms.

Figure 6A:
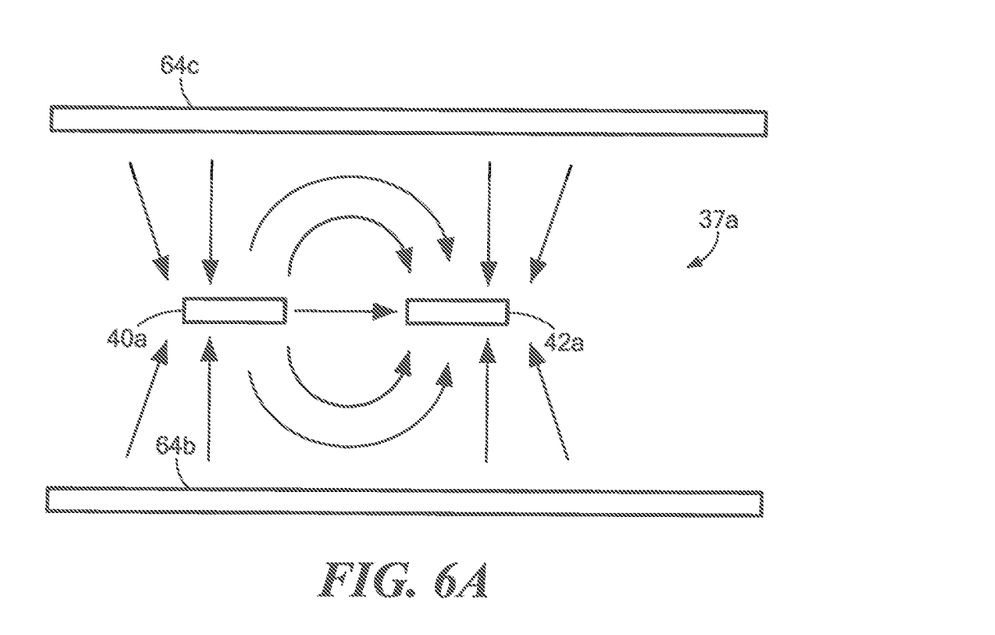
FIG. 6A is a diagrammatic sketch of an exemplary one of a stack of a differential transmission lines used in the circuit of FIG. 6.

As shown in FIG. 6A for an exemplary of the stacked differential transmission lines, here differential transmission line 37a has a pair of transmission lines 60a, 62a with the strip conductors 40a, 42a having an electric field coupled between them as shown in FIG. 6A, and with an electric field coupled between the strip conductors 40a, 42a and the pair of ground plane conductors 64b, 64c, as shown by the arrows in FIG. 6A.

It is noted that the connections between the strip conductors 40a, 42a-40c, 42c and the differential signal circuit transmitter 10a-10c and single ended signal circuit receiver 12a-12c are made through vertically extending conductive vias 76 which pass through the dielectric boards and are electrically insulated by the dielectric boards $74a_1$, $74a_2$-$74c_1$, $74c_2$, from the ground plane conductors 64a-64d.

It is also noted that the bottom surface of the differential signal circuit transmitters differential signal circuits, 10a-10c, and the bottom surface of the single ended signal circuits 12a-12c have ground plane conductors 64a-64d which are electrically connected to the ground plane conductors of the interface structure. Also, the ground of the circuits are all electrically interconnected A number of embodiments of the disclosure have been described. For example, other types of differential transmission lines may be used such as coaxial transmission lines where the coaxial transmission line includes a pair of electromagnetically coupled conductors. Nevertheless, it will be understood that various modifications may be made without departing from the spirit and scope of the disclosure. Accordingly, other embodiments are within the scope of the following claims.

What is claimed is:

1. An interface for connecting a differential signal circuit having a differential signal output and a reference potential terminal to an input of a single ended signal circuit, such single ended circuit having predetermined input impedance, and a reference potential terminal, comprising:
    a differential transmission line comprising a pair of electromagnetically coupled microwave transmission lines having first ends connected to the differential signal output and second ends, a first one of the second ends being connected to the single ended circuit input;
    wherein the predetermined input impedance of the single ended circuit is matched to a predetermined odd mode impedance of the differential transmission line; and
    wherein a second one of the second ends is coupled to the reference potential through an impedance matched to the predetermined odd mode impedance of the differential transmission line.

2. The interface recited in claim 1 wherein the differential transmission line includes a pair of electromagnetically coupled microwave transmission lines comprises microstrip transmission lines having a pair of strip conductors disposed over a common ground plane conductor.

3. The interface recited in claim 1 wherein the pair of microwave transmission lines comprises the electromagnetically coupled pair of microwave transmission lines comprises stripline structures having a pair of strip conductors disposed between a pair of common ground plane conductors to form a pair of stripline circuits.

4. The interface recited in claim 1 wherein the predetermined input impedance of the single ended circuit is equal to the impedance coupled between the second one of the second ends and the reference potential.

5. The interface recited in claim 1 wherein the impedance matching circuit includes a resistor.

6. An interface structure for connecting a plurality differential signal circuits, each one having a differential signal output and a reference potential terminal, to a plurality of single ended signal circuits, each one having an input, a predetermined input impedance, and being coupled to a reference potential terminal, comprising:

a plurality of stacked differential transmission lines, each one of the differential transmission line comprising a microwave stripline structure, each stripline structure having a pair of electromagnetically coupled strip conductors disposed in a plane between a pair of ground plane conductors to form a pair of stripline circuits for each one of the plurality of stacked differential transmission lines;

wherein the pair of strip conductors of each one of the stripline structures comprise:

first ends connected to the differential signal output of a corresponding one of the plurality of differential signal circuits and one of the second ends connected to the input of a corresponding one of the plurality of single ended circuits and the other one of the second ends coupled to the reference potential terminals through an impedance related to the input impedance of the corresponding one of the plurality of single ended circuits;

wherein the predetermined input impedance of the single ended circuit is matched to a predetermined odd mode impedance of the differential transmission line;

and wherein a second one of the second ends is coupled to the reference potential through an impedance matched to the predetermined odd mode impedance of the differential transmission line.

7. The interface structure recited in claim 6 wherein portions of the pair of strip conductors of one of the stripline structures overlay portions of the pair of strip conductors of another one of the stripline structures.

8. The interface recited in claim 6 wherein the impedance matching circuit includes a resistor.

* * * * *